Oct. 18, 1966 J. S. OLCOTT 3,279,931
GLASS-CERAMIC BODY AND METHOD OF MAKING IT
Filed Feb. 13, 1963 3 Sheets-Sheet 1

JOSEPH S. OLCOTT INVENTOR.

BY Clarence R Patty, Jr
ATTORNEY

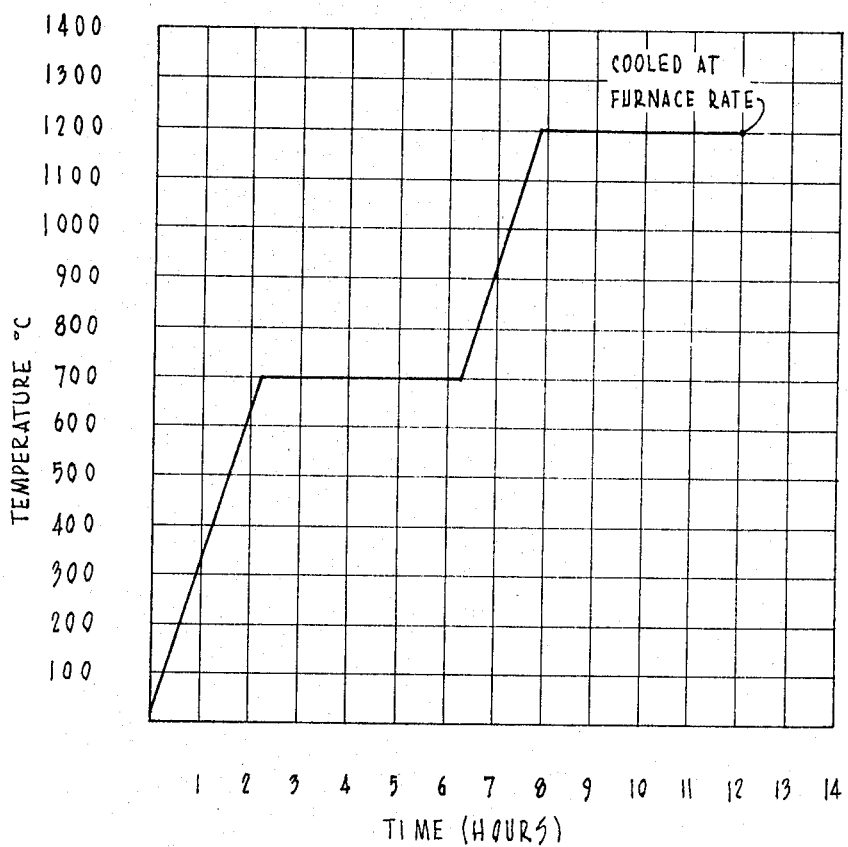

United States Patent Office 3,279,931
Patented Oct. 18, 1966

3,279,931
GLASS-CERAMIC BODY AND METHOD
OF MAKING IT
Joseph S. Olcott, Painted Post, N.Y., assignor to Corning Glass Works, Corning, N.Y., a corporation of New York
Filed Feb. 13, 1963, Ser. No. 258,274
7 Claims. (Cl. 106—39)

This invention relates to the production of glass-ceramic compositions which are particularly useful in thin-walled sections as heat exchangers. More specifically, this invention relates to the manufacture of glass-ceramic articles of the system $Li_2O \cdot Al_2O_3 \cdot SiO_2 \cdot TiO_2$ exhibiting good stability at elevated temperatures and which have a linear coefficient of thermal expansion between 25° C.–300° C. of between $\pm 3 \times 10^{-7}/°$ C. and between 25° C.–650° C. of between $\pm 5 \times 10^{-7}/°$ C.

The mechanics of manufacture and the theoretical considerations involved in the production of glass-ceramic or semicrystalline ceramic bodies, as they are sometimes called, are discussed at length in United States Patent No. 2,920,971 granted to S. D. Stookey. As explained therein, these bodies are developed through the controlled crystallization of a glass in situ. Broadly speaking, this controlled crystallization is actuated by incorporating a nucleating or crystallization-promoting agent within a glass-forming batch of the desired composition, melting the batch, and thereafter subjecting the shaped body to a heat treatment. By means of this heat treatment, the glass body is converted into an article consisting of fine-grained crystals dispersed substantially uniformly, though randomly oriented, throughout a glassy matrix and comprising a major proportion of the mass of the body. That patent also discloses three important features inherent in a semicrystalline ceramic product: (1) its physical properties generally differ substantially from those of the original glass; (2) as it is originally a glass, the article can be shaped into the desired configuration utilizing the conventional methods of shaping glass, such as, blowing, casting, drawing, pressing, rolling, spinning, etc.; and (3) because the crystallization of the glass occurs in situ, a body is produced which is substantially free of voids and non-porous. Stookey further discloses the exceptional ability of titania ($TiO_2$) to act as the nucleating agent for substantially any glass composition containing constituents of crystalline phases. Titania has had the broadest commercial use as a nucleator or crystallization-promoting agent for glass-ceramic bodies.

In the co-pending application, Serial No. 759,706, now U.S. Patent 3,112,184, submitted by Robert Z. Hollenbach, is described a method for forming ceramic articles composed of thin-walled sections. These thin-walled sections were of special utility in making heat exchangers having a honeycomb structure. According to this method, finely-ground ceramic material is applied to a flexible carrier strip, preferably an organic material such as tea bag paper or nylon cloth, by means of a binder, again preferably of organic material such as a resin or paraffin, the corrugated carrier is then formed into an article of the desired shape, and the article thereafter fired to sinter the ceramic particles into a unitary structure. Articles constructed in this way have enjoyed substantial commercial success. The ceramic materials suitable for this use include: glasses, such as the borosilicates, sodi-lime-silicates, lead silicates, and aluminosilicates; refractory materials, such as sillimanite, magnesia, zircon, and corundum; and glass-cearmics. This wide range of useful materials demonstrates the extreme variances in linear coefficient of thermal expansion inherent in articles formed in this manner from different materials. In certain applications, specifically in turbine regenerators for automobile engines, the material utilized must have an expansion coefficient of virtually zero. In other words, the regenerator material must be very stable, i.e., it should exhibit extremely little, and preferably no, expansion when exposed to the heat generated by the engine. Laboratory and field testing has manifested that optimum service life in such turbine regenerators is secured where the linear coefficient of thermal expansion of their components between 25° C. and 300° C. is within the range $\pm 3 \times 10^{-7}/°$ C. and between 25° C. and 650° C. is within the range $\pm 5 \times 10^{-7}/°$ C.

Therefore, the principal object of this invention is to provide a material capable of being formed into thin-walled sections, such material being very stable at elevated temperatures and exhibiting a linear coefficient of thermal expansion between 25° C. and 300° C. within the range $\pm 3 \times 10^{-7}/°$ C. and between 25° C. and 650° C. within the range $\pm 5 \times 10^{-7}/°$ C.

Another object of this invention is to provide a method of making a material capable of being formed into thin-walled sections, such material being very stable at elevated temperatures exhibiting a linear coefficient of thermal expansion between 25° C. and 300° C. within the range $\pm 3 \times 10^{-7}/°$ C. and between 25° C. and 650° C. within the range $\pm 5 \times 10^{-7}/°$ C.

Still another object of this invention is to provide a method of making thin-walled sections of the desired material which is relatively simple and economical in operation and which can be performed using apparatus and techniques well-known to the glass industry.

Other objects will become apparent from the following description and drawings wherein.

Figure 3:
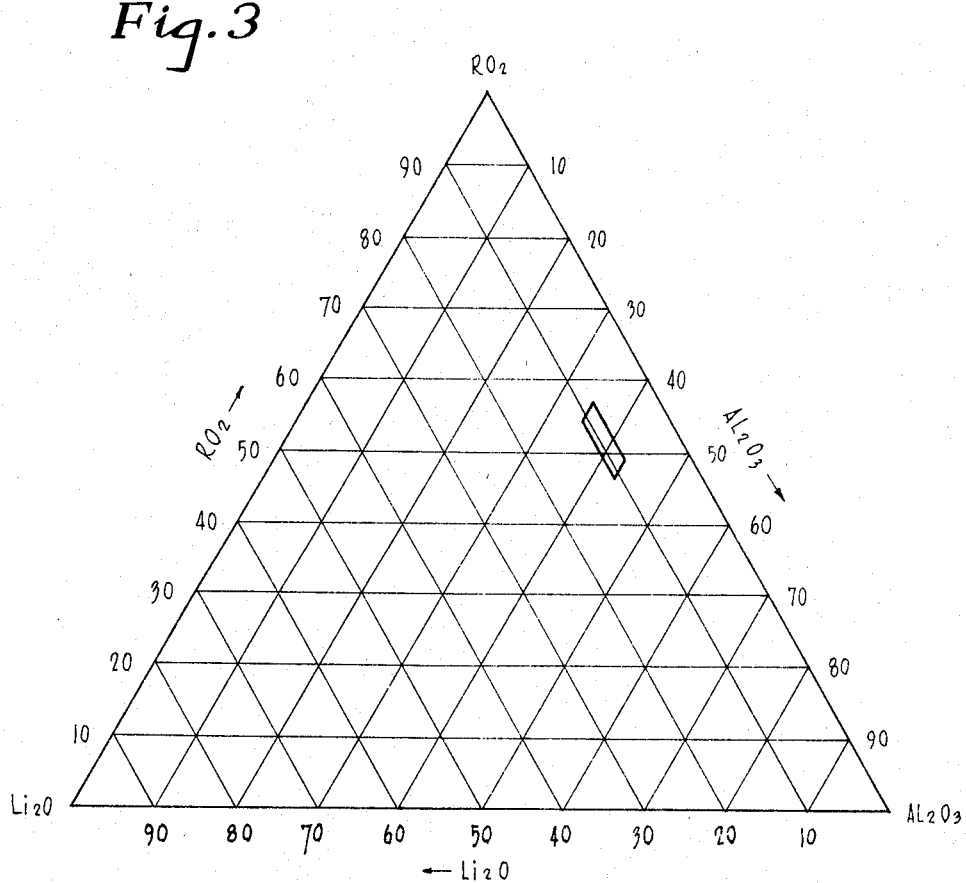

FIGURE 3 sets forth a ternary diagram describing the range of compositions applicable to this invention; and FIGURE 4 sets forth a time-temperature curve for the heat treatment of a specific embodiment of this invention.

I have discovered that these objects can be attained through the production of glass-ceramic or semicrystalline ceramic bodies of a particular composition. That is to say, I have discovered that thin-walled sections of semicrystalline ceramic bodies consisting essentially, by weight, of 43–52% $SiO_2$, 35–43% $Al_2O_3$, 8–11% $Li_2O$, 2–6% $TiO_2$, the total of said $SiO_2$, $Al_2O_3$, $Li_2O$, and $TiO_2$ being at least about 90% of said bodies, possess the required expansion characteristics for use in turbine regenerators for automobiles. Thus, where a glass-forming batch within the composition listed above is melted, cooled and shaped, and thereafter subjected to a particular heat treatment, a semicrystalline body generally comprising beta-eucryptite as the principal crystalline phase can be obtained. Such a body, within the composition limits prescribed, has a linear coefficient of thermal expansion falling within the desired ranges.

My invention, then, comprises melting a glass-forming batch consisting essentially, by weight, of 43–52% $SiO_2$, 35–43% $Al_2O_3$, 8–11% $Li_2O$, 2–6% $TiO_2$, the total of said $SiO_2$, $Al_2O_3$, $Li_2O$, and $TiO_2$ being at least about 90% of said glass, simultaneously cooling and shaping the melt into a glass body of the desired configuration, the cooling being rapid and continuing to at least below the transformation point, i.e., the temperature at which the liquid melt is considered to have been transformed into an amorphus or glassy solid, this temperature being generally in the vicinity of the annealing point of the glass (about 650° C. for glasses of this invention), thereafter raising the temperature to at least about 650° C., but not higher than about 1250° C., and holding thereat for a sufficient length of time to assure the desired development of crystallization. This time may vary from as little at ¼ hour at 1250° C. to 24 hours and sometimes longer at the lower extreme of the range. Longer times, of course, may be utilized but not to any particular economic advantage. Finally, if the rate of heating the glass body is relatively slow and the final temperature near the upper extreme of the heat treating schedule, no dwell time at a specified temperature will be required. At temperatures less than about 650° C., crystallization is sparse and slow forming, if present at all. At temperatures above about 1250° C., softening and melting of the semicrystalline body is a real danger.

I have learned that the heating rate applied to the glass bodies of this invention must be carefully controlled. The rate of heating which can be tolerated by glass shapes is normally dependent upon two factors: (1) the thermal shock resistance of the glass and (2) the speed of crystallization within the glass shape. The relatively low thermal expansion coefficient of the glasses of this invention lends them such resistance to thermal shock that this factor is only of minor significance herein when compared with the second factor. In the conventional heat treating process designed to secure a semicrystalline ceramic body, the glass article is heated above the transformation point in order to initiate crystallization after which the body is commonly raised to a still higher temperature to expedite and increase crystallization. When the glass article is heated above the transformation range, softening of the body occurs and deformation may take place. However, the softening point, and, therefore, the deformation of the semicrystalline body is much higher than that of the original glass. Thus, the rate of heating the glass article must be balanced against the rate at which crystals are developed within the body. An excessive rate of heating will prevent the development of sufficient crystallization to support the shape and slumping will occur. Further, crystallization proceeds more rapidly as the temperature of the body approaches the liquidus of the crystal phase. Therefore, in commercial practice, the bodies are treated at temperatures considerably higher than those whereat crystallization is first obtained. As mentioned above, the linear coefficient of expansion of the glasses herein is so low that the rate of heating a glass body from room temperature to the annealing or transformation point can be as high as 500° C./hour without fear of cracking or breakage. However, when the transformation range is exceeded, the rate must be carefully controlled. Although higher heating rates can be utilized, particularly if a relatively long holding period at the lower extreme of the crystallization range is employed, I prefer a rate of not over 5° C./minute and, advantageously, less. Thus, 5° C./minute has produced bodies with very little deformation. Nonetheless, the optimum heating rate provides a careful balance with the speed of crystallization. It will be appreciated that commercial practice demands a compromise between the desire for fast heating and, hence, fast production and the desire for negligible deformation. In some instances, heating rates as low as 1° C./minute and even ½° C./minute have yielded more acceptable products. As the linear coefficient of thermal expansion of the semicrystalline body is virtually zero, the cooling rate to room temperature after heat treatment is not important. If desired, the supply of heat to the furnace may merely be cut off and the furnace allowed to cool with the body retained therein. This is referred to hereinafter as cooling at furnace rate. Of course, the body may be directly removed from the furnace after the final heat treatment without harm thereto and in some instances this practice actually improves the body by increasing the strength thereof.

The limits of the composition ranges set forth above are critical to the invention. Variations outside the amounts of $SiO_2$, $Al_2O_3$, and $Li_2O$ prescribed, while yielding glass-ceramics having beta-eucryptite as the principal crystal phase, result in bodies having linear coefficients of thermal expansion outside of the ranges demanded for the product of this invention. At least 2% $TiO_2$ is required to initiate nucleation in the body while over 6% promotes crystallization as the melt is being quenched to a glass and raises the linear coefficient of expansion of the glass-ceramic body. Such crystallization which occurs as the melt is being quenched prohibits the development of a uniform, fine-grained semicrystalline body upon heat treatment. Other compatible metal oxides and fluorine may also be present provided their total amount does not exceed about 10% by weight of the batch. Such compatible metal oxides include: $Na_2O$, $SnO_2$, $B_2O_3$, $Fe_2O_3$, $CaO$, and $MgO$. $Na_2O$, $B_2O_3$, and fluorine aid in melting the batch while $SnO_2$, $Fe_2O_3$, $CaO$, and $MgO$ act to stabilize and strengthen the final bodies. Fluorine also aids in strengthening the final body.

Although the melts disclosed herein are generally of low viscosity, a fining agent such as $As_2O_3$ may be advantageously included in the batch to produce a homogeneous glass free from bubbles. Normally, only about 0.5–1% by weight is added and, as the amount remaining in the glass after the batch is melted is so small the fundamental properties of the glass are unaffected, the amount of fining agent is not noted in the succeeding table of compositions, Table I.

In the following examples, the batches were compounded, ball milled to assure a homogeneous melt, and then melted in open crucibles at about 1500° C. for about 16 hours. The melts were then drawn into cane and cooled as a glass to room temperature. The glass shapes were then placed in a furnace and subjected to the heat treatments recorded in Table II.

Table I sets forth examples of compositions exhibiting the desired stability and linear coefficient of thermal expansion calculated from their respective batches to the oxide basis in weight percent, exclusive of minor impurities which may be present in the batch materials. The batch ingredients may comprise any materials, either oxides or other compounds, which, on being fused together in a melt, are converted to the desired oxide compositions in the desired proportions. In accordance with conventional analytical procedure, the amount of fluorine is stated separately from the oxide composition. It will be appreciated that fluorine volatilizes fairly readily at the temperatures necessary to melt the batch. The amount of fluorine so lost depends upon a number of factors: melting time, melting temperature, batch materials utilized, composition of the resulting melt. In the present glasses, it is estimated that about 60% by weight of the fluorine in the batch remains in the glass when melted in open crucibles.

TABLE I
[In Percent]

|  | 1 | 2 | 3 | 4 | 5 | 6 | 7 |
|---|---|---|---|---|---|---|---|
| $SiO_2$ | 43.1 | 45.5 | 46.4 | 49.2 | 49.6 | 50.1 | 49.3 |
| $Al_2O_3$ | 42.2 | 38.1 | 38.8 | 35.9 | 36.3 | 36.6 | 35.4 |
| $Li_2O$ | 10.5 | 9.2 | 9.4 | 9.4 | 9.5 | 9.6 | 8.4 |
| $TiO_2$ | 3.0 | 3.25 | 5.3 | 5.5 | 4.6 | 3.7 | 5.2 |
| $B_2O_3$ | 1.0 |  |  |  |  |  | 1.7 |
| $Na_2O$ | 0.2 | 0.15 | 0.1 |  |  |  |  |
| $SnO_2$ |  | 3.8 |  |  |  |  |  |
| F |  | 1.8 | 1.8 |  |  |  |  |

|  | 8 | 9 | 10 | 11 | 12 | 13 | 14 |
|---|---|---|---|---|---|---|---|
| $SiO_2$ | 50.2 | 50.3 | 50.1 | 50.6 | 51.1 | 50.6 | 50.3 |
| $Al_2O_3$ | 35.9 | 35.9 | 35.9 | 36.2 | 36.6 | 36.2 | 36.1 |
| $Li_2O$ | 8.6 | 8.6 | 8.6 | 8.7 | 8.7 | 8.6 | 8.5 |
| $TiO_2$ | 5.3 | 5.2 | 5.4 | 4.5 | 3.6 | 3.6 | 4.4 |
| $B_2O_3$ |  |  |  |  |  | 3.6 |  |
| $Fe_2O_3$ |  |  |  |  |  | 1.0 |  |
| $CaO+MgO$ |  |  |  |  |  |  | 0.5 |
| F | 1.3 | 2.5 |  |  |  |  | 0.2 |

Table II sets forth the heat treating schedule to which each of the examples was subjected. In all instances, the glass shapes were cooled to room temperature prior to heat treatment. Also included in Table II are the linear coefficients of thermal expansion derived for each example.

These expansion coefficient measurements were obtained in the conventional manner.

TABLE II

| Ex. No. | Heat Treatment | Coef. of Thermal Exp. at— | |
|---|---|---|---|
| | | 25° C.–300° C. (10⁻⁷/° C.) | 25° C.–650° C. (10⁻⁷/° C.) |
| 1 | Plunged into furnace at 500° C.; Heat from 500° C. to 680° C. at 60° C./hour; Hold at 680° C. for 4 hours; Heat from 680° C. to 1,075° C. at 100° C./hour; Hold at 1,075° C. for 4 hours; Cool to 500° C. at 100° C./hour; Remove from furnace. | ±2 | ±3 |
| 2 | Plunged into furnace at 500° C.; Heat from 500° C. to 680° C. at 60° C./hour; Hold at 680° C. for 4 hours; Heat from 680° C. to 900° C. at 30° C./hour; Hold at 900° C. for 8 hours; Cool at furnace rate. | ±1 | ±3 |
| 3 | Plunged into furnace at 500° C.; Heat from 500° C. to 680° C. at 60° C./hour; Hold at 680° C. for 4 hours; Heat from 680° C. to 700° C. at 30° C./hour; Hold at 700° C. for 2 hours; Heat from 700° C. to 1,075° C. at 30° C./hour; Hold at 1,075° C. for 4 hours; Cool at furnace rate. | ±2 | ±3 |
| 4 | Heat to 700° C. at 5° C./minute; Hold at 700° C. for 4 hours; Heat from 700° C. to 1,200° C. at 5° C./minute; Hold at 1,200° C. for 4 hours; Cool at furnace rate. | ±1 | ±3 |
| 5 | Heat to 700° C. at 5° C./minute; Hold at 700° C. for 4 hours; Heat from 700° C. to 1,000° C. at 5° C./minute; Hold at 1,000° C. for 6 hours; Cool at furnace rate. | ±1 | ±3 |
| 6 | Heat to 700° C. at 5° C./minute; Hold at 700° C. for 2 hours; Heat from 700° C. to 1,250° C. at 60° C./hour; Cool at furnace rate. | ±1 | ±3 |
| 7 | Heat to 600° C. at 5° C./minute; Hold at 680° C. for 2 hours; Heat from 680° C. to 900° C. at 5° C./minute; Hold at 900° C. for 2 hours; Heat from 900° C. to 1,200° C. at 5° C./minute; Hold at 1,200° C. for 2 hours; Cool at furnace rate. | ±1 | ±5 |
| 8 | Heat to 650° C. at 5° C./minute; Hold at 650° C. for 2 hours; Heat from 650° C. to 700° C. at 60° C./hour; Hold at 700° C. for 2 hours; Heat from 700° C. to 1,200° C. at 5° C./minute; Hold at 1,200° C. for 2 hours; Remove from furnace. | ±1 | ±5 |
| 9 | Heat to 700° C. at 5° C./minute; Hold at 700° C. for 4 hours; Heat from 700° C. to 1,200° C. at 5° C./minute; Hold at 1,200° C. for 4 hours; Cool at furnace rate. | ±2 | ±5 |
| 10 | Plunged into furnace at 500° C.; Heated from 500° C. to 1,200° C. at 30° C./hour; Cooled at furnace rate. | ±1 | ±5 |
| 11 | Heat to 700° C. at 5° C./minute; Hold at 700° C. for 4 hours; Heat from 700° C. to 1,200° C. at 5° C./minute; Hold at 1,200° C. for 4 hours; Cool at furnace rate. | ±1 | ±3 |
| 12 | Heat to 700° C. at 5° C./minute; Hold at 700° C. for 4 hours; Heat from 700° C. to 1,250° C. at 5° C./minute; Hold at 1,250° C. for 2 hours; Cool at furnace rate. | ±1 | ±3 |
| 13 | Heat to 700° C. at 5° C./minute; Hold at 700° C. for 4 hours; Heat from 700° C. to 1,200° C. at 5° C./minute; Hold at 1,200° C. for 4 hours; Cool at furnace rate. | ±2 | ±3 |
| 14 | Heat to 700° C. at 5° C./minute; Hold at 700° C. for 4 hours; Heat from 700° C. to 1,200° C. at 5° C./minute; Hold at 1,200° C. for 4 hours; Cool at furnace rate. | ±1 | ±3 |

Table II clearly demonstrates the ability of the compositions of this invention to yield glass-ceramic bodies having a linear coefficient of expansion from room temperature (25° C.) up to at least about 650° C. of virtually zero. The extremely small variation in expansion resulting from the testing of several samples of each composition is a good indication of the homogeneity of the semicrystalline bodies. This low and uniform expansion coefficient renders these compositions extremely valuable for use in applications such as a turbine regenerator for automobiles where there are rapid temperature cycles of 1000° C. and more.

Examination of the semicrystalline ceramic bodies, themselves, has determined that the crystal content is at least about 75% by weight and in most cases is higher. This factor is dependent upon the extent to which the batch components are adaptable to the formation of crystal phases. The crystals are very fine-grained, i.e., they are substantially all finer than about 0.1 micron in diameter, and are randomly dispersed throughout the glassy matrix.

The very high degree of crystallinity attained in the semicrystalline ceramic body of this invention and the extreme fineness of the crystals, themselves, are of utmost importance in the structure of turbine regenerators for automobiles. These regenerators are designed and sealed into place in such a manner that even very small changes in dimensions (parts per million) cannot be tolerated. The crystalline material is substantially unaffected by temperature changes within ranges inherent in regenerator operation but the glassy matrix is not nearly so inert. These changes in dimension have even been encountered after long time operation at temperatures several hundred degrees below the melting point of the bodies. These variations, not unlike the effect of creep in metals, are due to the presence of the glassy phase within the body. Therefore, the essentially complete crystallinity of the glass-ceramic bodies of this invention makes them ideal for this application as they possess exceptional long term dimensional stability. The fineness of crystallization provides a body of higher strength than where the crystallization is coarse. The modulus of rupture of these bodies averages about 14,000–15,000 p.s.i.

Figure 1:
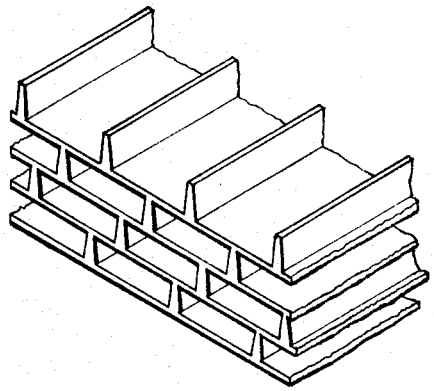
FIGURE 1 represents an expanded view demonstrating a manner of forming structures using the product of this invention.
Figure 2:
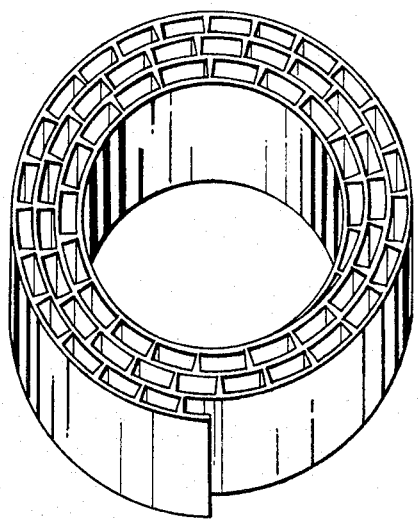
FIGURE 2 represents a specific structure, an annular cylinder, which can be made from the product of this invention.

Because the material of this invention is originally a glass, thin-walled sections for turbine regenerators for automobiles and other articles described in the aforementioned Hollenbach patent application, Serial No. 759,706, can be formed with relative ease. Thus, a ribbon of glass, with ribs on one side running perpendicularly to the length of the ribbon, can be rolled and then heat treated to yield the desired glass-ceramic. FIGURE 1 sets forth an expanded view demonstrating the laying up of one ribbed strip on top of another. FIGURE 2 illustrates an annular cylinder suitable as a rotating recuperator, such as a turbine regenerator, constructed by rolling the ribbed ribbon around a central core and thereafter heat treating to convert the glass to a glass-ceramic.

The base glass from which the semicrystalline ceramic body of this invention is formed has one characteristic which is of great assistance in the construction of turbine regenerators from ribbed ribbon. As can be seen in FIGURES 1 and 2, the top of the ribs of one sheet must adhere to the bottom surface of an overlying sheet. The glass ribbon of this invention may be taken directly from the rolling machine to a coiling machine while sufficiently hot to be somewhat sticky and then coiled as a glass into the annular cylinder illustrated in FIGURE 2. The ribs of one layer will adhere to the bottom surface of the overlying layer. After a cylinder of the desired size is obtained, it is subjected to the proper heat treatment to be converted into a glass-ceramic body. This ability to be cooled to a glass slowly enough to permit the sticking of one layer to another is of obvious economic advantage. The glasses of this invention devitrify very rapidly upon cooling and must be quenched relatively quickly to the transformation point in order to prevent crystallization occurring during this cooling step. However, in drawing ribbon, it was discovered, for as yet a not fully explainable reason, that cooling this ribbon rapidly to a temperature where the surface thereof was slightly sticky, devitrification would not occur and the ribbed ribbon could be rolled into an integral cylinder.

FIGURE 3 illustrates the narrow ranges of compositions of $Al_2O_3$, $Li_2O$, and $RO_2$ applicable to this invention, where $RO_2$ represents the combination of $SiO_2$ and $TiO_2$, i.e., R represents a tetravalent element selected from the group consisting of Si and Ti.

FIGURE 4 sets forth the time-temperature curve for the most satisfactory heat treatment of the preferred composition, Example 14. This composition possesses good melting properties and exhibits excellent expansion characteristics. Thus, after the batch had been melted, shaped, and cooled to room temperature, the glass body was subjected to the following heat treatment: the temperature was raised at 5° C./minute to 700° C., maintained thereat for 4 hours, thereafter the temperature was raised at 5° C./minute to 1200° C., maintained thereat for 4 hours, and then cooled to room temperature at furnace rate.

The embodiments of an invention in which an exclusive property or privilege is claimed are defined as follows:

1. A semicrystalline ceramic body exhibiting good stability at elevated temperatures and having a linear coefficient of thermal expansion between 25° C.–300° C. of $\pm 3 \times 10^{-7}/°$ C. and a linear coefficient of thermal expansion between 25°–650° C. of $\pm 5 \times 10^{-7}/°$ C. consisting essentially of a multiplicity of fine-grained crystals dispersed in a glassy matrix, said crystals being formed by crystallization in situ from a glass body formed from a batch consisting essentially, by weight, of 43–52% $SiO_2$, 35–43% $Al_2O_3$, 8–11% $Li_2O$, and 2–6% $TiO_2$, the total of said $SiO_2$, $Al_2O_3$, $Li_2O$, and $TiO_2$ comprising at least about 90% of said batch, said glassy matrix consisting essentially of the uncrystallized portion of the glass remaining after crystallization of said crystals.

2. A semicrystalline ceramic body according to claim 1 where said crystals are predominantly beta-eucryptite.

3. A semicrystalline ceramic body according to claim 1 wherein said crystals comprise at least 75% by weight of said body.

4. A semicrystalline ceramic body according to claim 1 wherein substantially all of said crystals are finer than 0.1 micron in diameter.

5. A method of manufacturing a semicrystalline ceramic body exhibiting good stability at elevated temperatures and having a linear coefficient of thermal expansion between 25° C.–300° C. of $\pm 3 \times 10^{-7}/°$ C. and a linear coefficient of thermal expansion between 25° C.–650° C. of $\pm 5 \times 10^{-7}/°$ C. comprising the steps of melting a glass-forming batch consisting essentially, by weight, of 43–52% $SiO_2$, 35–43% $Al_2O_3$, 8–11% $Li_2O$, and 2–6% $TiO_2$, the total of said $SiO_2$, $Al_2O_3$, $Li_2O$, and $TiO_2$ comprising at least about 90% of said batch, rapidly cooling the melt to a glass shape below the transformation point of said melt, thereafter exposing said glass shape to a temperature of at least about 650° C., but not higher than about 1250° C., maintaining thereat for a sufficient time to attain the desired crystallization, and then cooling said shape to room temperature.

6. A method according to claim 1 wherein the time sufficient to attain the desired crystallization varies from 2–24 hours.

7. A method of manufacturing a semicrystalline ceramic body exhibiting good stability at elevated temperatures and having a linear coefficient of thermal expansion between 25° C.–300° C. of $\pm 3 \times 10^{-7}/°$ C. and a linear coefficient of thermal expansion between 25° C.–650° C. of $\pm 5 \times 10^{-7}/°$ C. comprising the steps of melting a glass-forming batch consisting essentially, by weight, of 43–52% $SiO_2$, 35–43% $Al_2O_3$, 8–11% $Li_2O$, and 2–6% $TiO_2$, the total of said $SiO_2$, $Al_2O_3$, $Li_2O$, and $TiO_2$ comprising at least about 90% of said batch, rapidly cooling the melt to a glass shape below the transformation point of said melt, thereafter raising the temperature of said glass shape at not more than 5° C./minute to about 700° C., maintaining therat for about 4 hours, raising the temperature of said shape at not more than about 5° C./minute to about 1200° C., maintaining thereat for about 4 hours, and then cooling said shape to room temperature.

References Cited by the Examiner

FOREIGN PATENTS 940,706   10/1963   Great Britain.

OTHER REFERENCES

Eppler: Glass Formation and Recrystallization in the Lithium Metasilicate Region of the System $Li_2O–Al_2O_3–SiO_2$—J. Am. Ceramics Society 46; February 21, 1963, pp. 97–101.

TOBIAS E. LEVOW, *Primary Examiner.*

H. McCARTHY, *Assistant Examiner.*